US012037691B2

United States Patent
Gani

(10) Patent No.: US 12,037,691 B2
(45) Date of Patent: Jul. 16, 2024

(54) METHOD OF COMPACTING AN ANTI-CORROSIVE PAINT OF A TURBINE ENGINE PART

(71) Applicant: SAFRAN AIRCRAFT ENGINES, Paris (FR)

(72) Inventor: Léa Rébecca Gani, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/684,397

(22) Filed: Nov. 14, 2019

(65) Prior Publication Data
US 2020/0157691 A1 May 21, 2020

(30) Foreign Application Priority Data
Nov. 16, 2018 (FR) ...................... 1860569

(51) Int. Cl.
*C23C 24/06* (2006.01)
*F01D 5/06* (2006.01)
*F16C 3/02* (2006.01)

(52) U.S. Cl.
CPC ............... *C23C 24/06* (2013.01); *F01D 5/06* (2013.01); *F16C 3/02* (2013.01); *F05D 2230/90* (2013.01); *F05D 2260/95* (2013.01); *F05D 2300/121* (2013.01); *F05D 2300/611* (2013.01); *F16C 2202/32* (2013.01); *F16C 2204/20* (2013.01); *F16C 2223/42* (2013.01); *F16C 2223/80* (2013.01); *F16C 2360/23* (2013.01)

(58) Field of Classification Search
CPC .................................................... C23C 24/06
See application file for complete search history.

(56) References Cited

U.S. PATENT DOCUMENTS

| 4,924,643 A | * | 5/1990 | Buiguez | B24C 11/00 451/39 |
| 5,344,494 A | * | 9/1994 | Davidson | A61F 2/30767 451/39 |
| 6,174,225 B1 | * | 1/2001 | Becker | B24C 1/003 451/39 |
| 8,696,819 B2 | * | 4/2014 | Boggs | B08B 9/0433 134/8 |
| 2003/0073380 A1 | * | 4/2003 | Anderson | B24C 1/003 451/5 |
| 2007/0141371 A1 | * | 6/2007 | Hazel | C23D 5/00 427/421.1 |

FOREIGN PATENT DOCUMENTS

| EP | 1598444 A1 | * | 11/2005 | ............. B24C 1/003 |
| EP | 1598444 A1 | | 11/2005 | |
| WO | 2015/074765 A1 | | 5/2015 | |

OTHER PUBLICATIONS

Rapport de Recherche Preliminaire, mailed Sep. 6, 2019, issued in corresponding French Application No. 1860569, filed Nov. 16, 2018, 2 pages.

* cited by examiner

*Primary Examiner* — Dah-Wei D. Yuan
*Assistant Examiner* — Kristen A Dagenais
(74) *Attorney, Agent, or Firm* — Christensen O'Connor Johnson Kindness PLLC

(57) ABSTRACT

A method of compacting an anti-corrosive paint comprising metal particles and covering a mechanical part such as a turbine engine part, the method comprising a step of at least one spraying of solid ice particles on the part so as to densify and to make the paint electrically conductive.

17 Claims, 1 Drawing Sheet

METHOD OF COMPACTING AN ANTI-CORROSIVE PAINT OF A TURBINE ENGINE PART

FIELD OF DISCLOSURE

Embodiments of the present disclosure relate to the field of surface treatments of mechanical parts against corrosion. The embodiments relate, in particular, to a method of compacting an anti-corrosive paint covering a part, for example a turbine engine part.

BACKGROUND

Mechanical parts, in particular those used in aircraft turbine engines, are exposed to environments which are constraining in terms of temperatures, corrosive elements, and oxidation reactions. Parts, such as the compressor and low-pressure turbine shafts, are made, for example, of steel or a steel alloy with a reduced cobalt content, so as to have an increased mechanical resistance. These steels have a high sensitivity to corrosion phenomena which are mainly manifested by the development of corrosion pits consisting of localized and deep attacks. These parts are also subjected to heavy mechanical stresses during the functioning of the turbine engine, which can lead to development of the corrosion. The constraint/corrosion synergy effect leads to a notable increase in corrosion phenomena.

Certain parts have been covered by a paint which is resistant to increased temperatures and to different corrosive and oxidative elements (kerosene, oil, etc.), such that these resist the environment, in which they occur, and in particular protect them from corrosion. This paint being partially composed of chromium trioxide, has been classed as CMR, which is the acronym for Carcinogenic, Mutagenic, Reprotoxic, and is governed by the REACH regulation, on the Registration, Evaluation, Authorisation and Restriction of Chemical substances.

In order to avoid constraints linked to this regulation, a solution consisting in making the paint anodic has been developed. Examples of this solution are described in documents FR-A1-2991216 and FR-A1-3040013. In particular, this solution consists in spraying on the surface of the part, a liquid paint having a mineral binder and loaded with metal particles, such as aluminium. This paint is sprayed via a gun handled by an operator. The paint-coated part is heated in a furnace to polymerise the sprayed paint. The polymerised paint then undergoes a mechanical action such as compacting, in order to put the metal particles in contact, without damaging the cosmetic and physical appearance of the paint. This action makes it possible to achieve electrical continuity of the metal particles with the metal parts to be treated. The paint layer is thus made dense and electrically conductive, to make this a sacrificial layer which will preferably be corroded, instead of the metal of the part to be protected. Thus, the term "anodic paint" is used to describe the sacrificial layer that has been rendered conductive.

The compacting consists of sandblasting or grit blasting the painted portions after polymerisation with white corundum particles, glass balls, or plastic particles. The compacting makes it possible to densify the paint and give it sacrificial properties, responsible for the efficient anti-corrosive properties thereof. Alternatively, it is also known to produce the anodic paint by buffing. The buffing is a manual punching of the part with sandpaper which takes a long time to implement.

The step consisting in making the paint anodic is optional when the paint contains chromium trioxide. It is, however, essential for paints which do not contain it.

However, the particles used for the compacting can be embedded in the paint and on the surface thereof. In operation, a discharge or release of these particles can occur and can damage other members of the turbine engine which are in the path of these particles. Certain particles like corundum, which is a mineral element, has an increased hardness of around 9.5 on the Mohs scale. For parts, like the turbine shafts and the compressor shafts, the compacting step is therefore not carried out to avoid the release of these very hard particles at an increased speed, which leads to a decrease of the anti-corrosive properties thereof. Indeed, the paint layer not being conductive without the compacting, it plays a very low anti-corrosive protective role, only by forming a barrier on the surface of the part. The anti-corrosive effect brought by this layer forming a barrier depends largely on the porosity rate thereof.

In addition, as soon as the part is scuffed or scratched, the protection stops and the part becomes sensitive to corrosion. Furthermore, for these parts of which the coating is not compacted, the paint is applied manually in at least two layers to limit, to a minimum, its porosity. This extends the duration for producing the part without counting the different steps necessary for preparing the front part, during and after the application of the paint. Controlling the thicknesses of the different layers of paint is difficult, and in particular on parts having a complex configuration.

SUMMARY

Embodiments of the present disclosure aim to provide a simple and effective solution, making it possible to ensure densification of an anti-corrosive paint to increase protection against corrosion, without embedding of hard particles, and by avoiding damaging the anti-corrosive paint.

This aim is achieved, for example, due to a method of compacting an anti-corrosive paint comprising metal particles and covering a mechanical part such as a turbine engine part. The method in some embodiments comprises a step of at least one spraying of solid ice particles on the part so as to densify and to make the paint electrically conductive.

Thus, this solution makes it possible to achieve the abovementioned aim or others. In some embodiments, such solid ice particles make it possible to densify the paint which covers the mechanical part in order to put the metal parts located in the paint in contact, which increases the resistance thereof to corrosion. The solid ice particles also make it possible, on the one hand, to remove the problems of embedding and discharge, when functioning, of foreign particles such as glass balls or corundum particles, since these will disappear by being sublimated following the impact thereof on the paint. In this manner, the physical integrity of the paint is preserved. Finally, embodiments of this method is easily automated, such that it makes it possible to reduce the manual operations consisting, among other things, of applying different layers of paint to overcome the embedding of foreign particles, and consequently, a gain in terms of the production timeframe and cost.

Embodiments of the method also comprise one or more of the following features or steps, taken individually or in combination:

the solid particles comprise carbon dioxide particles,
the solid particles are sublimated after impact on the paint, the solid particles are sprayed at a pressure of between 2 and 8 bars, the solid particles have dimensions of between 1 and 30 mm, and preferably 3 mm, the distance between the surface of the part and the nozzle is between 20 and 100 mm, the solid particles are sprayed along at least one beam with a general direction that has an inclination with respect to the surface of the part which is between 30° and 90°, the solid particles are sprayed along at least one beam which is moved at a speed of between 40 and 60 mm/s, the method comprises two steps of spraying particles over the surface of the part, the part is a turbine engine shaft, the solid particles can be sprayed by sandblasting or grit blasting devices, the spraying of the solid particles is implemented in a closed enclosure, preferably at ambient temperature, the hardness of the solid ice particles is between 2 and 2.5 Mohs, the sublimation temperature of the solid ice particles after impact is of around −78.9° C., the metal particles comprise aluminium.

The disclosure also relates to a method for producing an anodic coating. In an embodiment, the method comprises the following steps:

spraying a liquid paint loaded with metal particles over a surface of the part, polymerisation of the paint sprayed over the part so as to obtain an anti-corrosive paint layer intended to protect the part, compacting the anti-corrosive paint so as to obtain an anodic paint, the compacting comprising at least one spraying of solid ice particles in the direction of the anti-corrosive paint so as to densify the anti-corrosive paint and to make it electrically conductive.

The disclosure also relates to the use of dry solid ice particles to achieve a compacting of anti-corrosive paint coating a metal part, and for example a turbine engine part.

The disclosure also relates to a mechanical part, in particular of a turbine engine, covered at least partially by a compacted anti-corrosive paint according to the abovementioned method.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
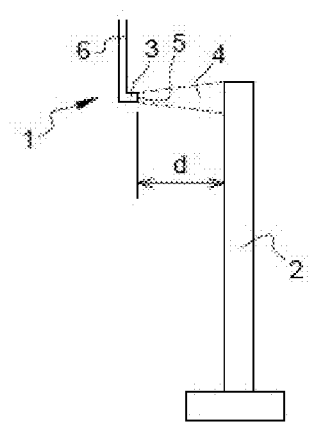
FIG. 1 is a schematic front view of an example of a device for compacting a part according to the disclosure.
Figure 2:
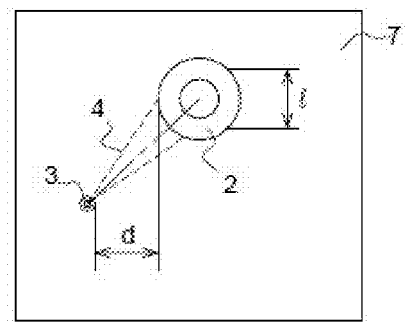
FIG. 2 is a schematic top view of the compacting device of FIG. 1.

FIGS. 1 and 2 represent, respectively, as a front view and as a top view, a device for compacting 1 an anti-corrosive paint coating the surface of a mechanical part 2, and in particular of a mechanical part of an aircraft turbine engine. The term "mechanical part" is used to describe parts intended to ensure, in service, a mechanical function, which implies that these parts have a good mechanical strength, as well as a good resistance to corrosion and to wear. Turbine engine shafts, for example, compressor and/or turbine shafts are thus non-exhaustive examples of mechanical parts relating to the disclosure.

It should be noted that, prior to the compacting method, the part 2 is covered by an anti-corrosive paint. The paint is an inorganic paint or any paint comprising metal particles. In particular, a liquid paint loaded with metal particles is sprayed over the surface of the part. Advantageously, the metal particles are aluminium particles. Examples of anti-corrosive parts applied on the surface of the parts are those known under the brand Sermetel W® or Maberbind CF®.

After spraying the paint, the coated part is polymerised such that the paint hardens and forms the anti-corrosive paint intended to protect the part.

The anti-corrosive paint is then compacted. For this, the compacting is achieved by the compacting device 1. By the term "compacting", this means, in the present disclosure, the action of spraying materials, possibly abrasive, at a high speed on the surface of the coated part to make the paint conductive. In this manner, the anti-corrosive paint is densified which puts the metal particles of the paint in contact and increases its strength against corrosion. The paint is made electrically conductive. Thus, an anodic coating is obtained.

The compacting device 1 comprises at least one nozzle 3 which is configured to spray a beam or a jet 4 of solid particles, making it possible to treat the surface of the turbine engine part. In the present example, the device 1 comprises a single nozzle 3 with an outlet orifice 5 placed at a distance from the part 2. The nozzle 3 is connected to a line 6 which is supplied with solid particles. The solid particles are kept in a reservoir (not shown). In some embodiments, the outlet orifice 5 of the nozzle is placed at a distance d from the surface of the part which is between about 20 mm and about 100 mm. Advantageously, but in a non-limiting manner, the predetermined distance d is between about 30 mm and about 60 mm. Preferably, the distance is 50 mm.

The nozzle 3 has a general direction which is inclined with respect to the surface of the part so as to avoid early wear of the solid particles. This inclination is between about 30° and about 85°. The minimum limit of about 30° makes it possible to avoid scraping of the paint. In some embodiments, the inclination of the nozzle with respect to the part is between about 45° and about 90°. It is arranged to achieve between one and two passages of the beam of solid particles on the surface of the part, in order to preserve the physical and cosmetic integrity of the paint.

To spray the particles, the nozzle 3 is moved along the height and the circumference of the part, preserving, at any time, the same geometry for the relative position of the nozzle and the surface of the part.

Of course, the disclosure is not limited to using this compacting device, which is only described as an example. The compacting device could, for example, comprise two nozzles, each sending a jet or beam of particles 3, and each oriented between about 30° and about 90° with respect to the surface of the part 1, the two beams being extended in one same plane. The general directions of the two nozzles are oriented at 90° from one another. The two beams join at one focalisation point 4 which is situated on the part 1, i.e. they both reach the same point to be treated. Given the solid angle characterising the divergence of the beams 3, the surface subjected at each moment to sandblasting has the shape of a circle of diameter "I".

The compacting device 1 here is a high-pressure cryogenic cleaning system.

The compacting device 1 is advantageously installed in an enclosure 7 provided for this purpose. The enclosure 7 is closed by a door, through which the part is introduced. Advantageously, inside the enclosure, an ambient temperature and a controlled hygrometry prevail, in order to avoid the condensation of water on the part. Of course, it is not necessary for the enclosure to be closed.

The solid particles used to achieve the compacting of the anti-corrosive paint, which here covers the turbine engine part, are dry ice particles. These solid ice particles are composed advantageously, but in a non-limiting manner, of carbon dioxide ($CO_2$) in solid form. Solid carbon dioxide is also known by the name of dry ice.

The solid ice particles are sprayed in the direction of the surface of the part (which is coated with paint) with a sufficient energy to densify the paint covering it. Once the solid particles have impacted the anti-corrosive paint, these are sublimated. This is made possible, thanks to the ambient temperature of the enclosure 7. The solid carbon dioxide is transformed into gas, which makes it possible not to leave particles embedded (superimposed) in the anti-corrosive paint. The sublimation temperature of the ice particles after impact is between 75° C. and 80° C. Advantageously, but in a non-limiting manner, the sublimation temperature is of around −78.9° C.

Advantageously, but in a non-limiting manner, a drying step can be implemented after the compacting, so as to control the condensation which can form after the sublimation of the solid dry ice particles. This can occur before the opening of the enclosure.

The solid particles have dimensions of between about 1 mm and about 30 mm. Advantageously, but in a non-limiting manner, the dimensions of these particles are between about 1 and about 10 mm. In one embodiment, the dimensions of the solid particles are about 3 mm. The particles can have a spherical shape.

The solid ice particles are delivered at a pressure of between about 2 and about 8 bars, and between about 5 and about 8 bars in some embodiments. In an embodiment, the pressure at which the particles are delivered is between about 6 bars and about 8 bars. This makes it possible to densify the paint without damaging it. There is no stripping of the paint with such an operational range. Likewise, in order to preserve the physical and cosmetic integrity of the paint, the ice particles are sprayed with a mass flow of between about 0.8 kg/h and about 2 kg/h. In an embodiment, the mass flow is between about 1 and about 1.5 kg/h.

The beam (cluster) of particles is moved to the surface of the part at a speed of between about 40 mm/s and about 60 mm/s. In an embodiment, the speed of the nozzle is about 50 mm/s.

The spraying of the ice particles at a constant pressure is facilitated thanks to an air flow sprayed at the same time as the particles in the nozzle, so as to facilitate the spraying of the particles. The nozzle 3 is moved at a speed of between about 40 mm/s and about 60 mm/s to move the cluster of ice particles.

Alternatively, a suctioning grit blasting machine, with a spray featuring an adapted air pressure and mass flow, can be considered for spraying the solid ice particles. This machine is, for example, equipped with one or two round nozzles of about 10 to about 14 mm.

Salt-spray tests (according to standard ISO 9227) to evaluate the resistance to corrosion of the paint thus compacted, have made it possible to demonstrate that this ensures its anti-corrosive role for the substrate after 168 hours of ageing. The ice particles also have the advantage of being sublimated after having been in contact with the paint, which leaves no trace of superimposed elements, contrary to the particles used in the prior art.

Figure 3:
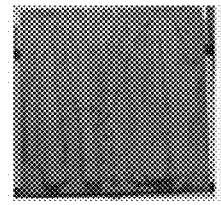
FIG. 3 represents an image of a test tube coated with a non-compacted paint after ageing.
Figure 4:
FIG. 4 represents an image of a test tube coated with a compacted paint with dry solid ice particles according to the disclosure.

FIGS. 3 and 4 show a comparison after 168 hours of ageing between a test tube (representing the mechanical part) coated with a single non-compacted paint layer and a test tube coated with a single paint layer with compacting with the dry ice. The paint layer is about 50 μm. FIG. 3 shows that thick and dense rust has is developed at several locations on the surface of the test tube. Conversely, the test tube of which the paint is compacted with the dry ice particles of FIG. 4 has no traces of rust developed on the surface of the part. This demonstrates well that the ice particles make it possible to densify the paint layer and can improve its strength against corrosion.

Figure 6:
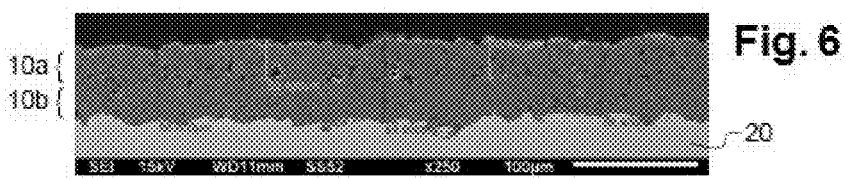
FIG. 6 illustrates an image taken with an SEM of a paint having undergone compacting with ice particles according to the disclosure.
Figure 5:
FIG. 5 illustrates an image taken with an SEM of a paint not having undergone compacting.

FIGS. 5 and 6 are images captured with an SEM (which is the acronym for Scanning Electron Microscope) and make it possible to observe the densification of the paint applied on two layers on a test tube 20, respectively with and without compacting. Each layer has a thickness of between 50 μm+/−10%. FIG. 5, which represents a non-compacted paint, shows that the paint has numerous porosities between the surface of the test tube 20 and the outer surface of the paint. The second paint layer (upper layer) 10a, which is situated at around 37 μm from the outer surface of the part, contains more porosities, and is even almost filled with porosities, than the first paint layer (lower layer) 10b in contact with the surface of the test tube 20.

Concerning the paint compacted with the ice particles represented in FIG. 6, it can be seen that the size and the quantity of porosities have clearly decreased in the second layer 10b. It is also noted that there is no embedding of foreign particles. The compacting operation by ice particles has not damaged, nor scraped the paint since the measured thickness of paint only has decreased by 5 to 10 μm (maximum authorised of 10 μm). As a result, the compacting with solid dry ice particles removes the risks of discharge or release of particles having been used for the compacting, since the dry ice particles are sublimated here in contact after impact on the part.

In an embodiment with a paint layer having a thickness of about 50 μm, the dry ice particles have been sprayed according to an inclination with respect to the surface of the part of about 90°. The particles have been sprayed, as a maximum, twice over the surface of the part. With a salt-spray test after 168 hours of ageing, the test tube has no red corrosion, nor any attack of localised corrosion (corrosion pit).

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of compacting an anti-corrosive paint comprising metal particles and covering a mechanical part, the anticorrosive paint having a predetermined thickness, the method comprising:
   at least a first step of spraying solid ice particles on the part so as to densify and to make the paint electrically conductive, and without damaging removal portion of said anti-corrosive paint, wherein the first step of spraying is performed with predetermined parameters to avoid removal of a portion of said anti-corrosive paint; and
   at least a second step of spraying solid ice particles on the part with the same predetermined parameters,
   wherein the solid ice particles have dimensions of between 3 mm and 10 mm,
   wherein the first and second steps of spraying solid ice particles reduces the predetermined thickness between 5 to 10 µm.

2. The method according to claim 1, wherein said solid ice particles comprise carbon dioxide particles.

3. The method according to claim 1, wherein the solid ice particles are sprayed at a pressure of between 2 bars and 8 bars.

4. The method according to claim 1, wherein the solid ice particles are sprayed according to at least one beam, of which the general direction has an inclination with respect to the surface of the part which is between 30° and 90°.

5. The method according to claim 1, wherein the distance between the surface of the part and the nozzle for spaying the solid ice particles is between 20 mm and 100 mm.

6. The method according to claim 1, wherein the solid ice particles are sprayed according to at least one beam which is moved at a speed of between 40 mm/s and 60 mm/s.

7. The method according to claim 1, wherein the method comprises two steps of spraying solid ice particles over the surface of the part.

8. The method according to claim 1, wherein the metal particles comprise aluminium.

9. The method according to claim 1, wherein the mechanical part is a turbine engine shaft.

10. The method according to claim 1, wherein the solid ice particles have dimensions of 3 mm.

11. The method according to claim 1, wherein the mechanical part is a turbine engine part.

12. The method according to claim 1, wherein the solid ice particles are sprayed with a mass flow of between 0.8 kg/h and 2 kg/h.

13. The method according to claim 12, wherein the solid ice particles are sprayed between 1 kg/h and 1.5 kg/h.

14. The method according to claim 3, wherein the solid ice particles are sprayed at a constant pressure.

15. The method according to claim 1, wherein the hardness of the solid ice particles is between 2 Mohs and 2.5 Mohs.

16. A method, comprising the steps of:
   applying a paint comprising metal particles and covering a mechanical part, the metal particle comprises aluminium;
   polymerising the paint to form an anti-corrosive paint intended to protect the mechanical part;
   compacting the anti-corrosive paint by spraying solid ice particles having dimensions of about 3 mm on the anti-corrosive paint of said part so as to densify said anti-corrosive paint by reducing porosity in at least one layer of the anti-corrosive paint and making the paint electrically conductive, wherein the step of spraying solid ice particles reduces the predetermined thickness between 5 to 10 µm,
   wherein the metal particles located in the anti-corrosive paint after the step of compacting are in contact and increase the resistance of the anti-corrosive paint to corrosion, the anti-corrosive paint not being damaged by removal after compacting.

17. The method according to claim 10, wherein, after said spraying, the part exhibits no corrosion a duration of 168 hours after administration of a salt-spray test according to standard ISO 9227.

* * * * *